UNITED STATES PATENT OFFICE.

JOHN G. HODGSON, OF MAYWOOD, ILLINOIS, ASSIGNOR TO AMERICAN CAN COMPANY, OF NEW YORK, N. Y., A CORPORATION OF NEW JERSEY.

LACQUER COMPOSITION FOR CANS.

1,148,168.      Specification of Letters Patent.      Patented July 27, 1915.

No Drawing.      Application filed August 10, 1911. Serial No. 643,265.

*To all whom it may concern:*

Be it known that I, JOHN G. HODGSON, a citizen of the United States, residing in Maywood, in the county of Cook and State of Illinois, have invented a new and useful Improvement in Lacquer Composition for Cans, of which the following is a specification.

This invention relates to a lacquer composition suitable for coating the interior and exterior of cans and tin vessels for protecting the same against the action of the acids with which they are likely to come into contact, and the invention consists in the compound made up as hereinafter set forth and claimed.

The object of my invention is to provide a protective coating composition or lacquer capable of being readily, conveniently and quickly dried and hardened after application to the interior surface of the can, and which, when so dried and hardened, will form a perfect, smooth, effective, firmly adherent, hard, dry, solid, tasteless, harmless, protective coating on the interior surface of the cans, which will be insoluble and unaffected by acids or juices of fruits, vegetables, and other food products, and which will not be injuriously affected by the heat of the cooking or processing operations to which the cans are subjected after being filled, nor by the heat of the soldering operation by which the can cap which closes the filling opening is secured or soldered in place after the can has been filled.

In the compounding and manufacture of my improved lacquer, I take two pounds of what is called wood pitch, that is to say, the pitchy residue remaining after the destructive distillation of wood, and one pound of either gas pitch, that is to say, the residue left in gas retorts, or in lieu thereof, one pound of the residue of the distillation of petroleum, known as parolite pitch. These two kinds of pitch I place in a suitable vessel and cook, at a temperature of 375 to 400 degrees Fahrenheit, for three hours or long enough to drive off the volatile non-drying portions, so that when the material is subsequently cooled, it will be hard and easily broken into lumps, and if put in a mortar may be readily reduced to a powder. I do not usually powder the combined pitch, but prefer to break it into small lumps. I take of this cooked material broken up, about six ounces by weight and mix it with one gallon of benzol or equivalent solvent and allow the mixture to stand until the pitch is thoroughly dissolved or cut, when the lacquer is ready for use. It generally takes three or four days to form a perfect solution of the pitch in the benzol. The foregoing composition when applied as a lacquer to tin vessels, and allowed to harden, is tasteless, odorless, substantially inocuous and will stand the action of boiling water, and also the hot acids, etc., which are often encountered in the canning of fruits and vegetables, catsups, pickles, cider, etc. Sometimes I add boiled linseed oil in proportion of three or four per cent. by weight of the weight of the solid material, and I find that this addition of the oil does not materially affect the drying qualities of the lacquer.

Pitches of the kind above named, as the same are purchased in the open market, are not always alike. Some contain more oils or oily ingredients than others, and it is my purpose in cooking the pitches together to drive these oily ingredients out until the remainder is in a suitable condition to use for the lacquer, and I determine this by dissolving a small quantity of the cooked pitch in the benzol solvent, applying it to a tin surface, and putting this lacquered surface in boiling water. If the boiling water dissolves the lacquer, the pitch should be cooked more, until the boiling water will no longer dissolve it. A fairly good test also is to cook the pitches until so hard that they can be readily pulverized in a mortar. Owing to the varying conditions of the material, I do not wish to limit myself to the exact length of time in cooking the pitches.

I claim:—

1. A protective lacquer or coating composition suitable for coating the interior walls of sheet metal cans and adapted to withstand a processing heat which includes, in combination wood pitch, from which the volatile non-drying portions thereof have been removed, dissolved in benzol, substantially as specified.

2. A protective lacquer or coating composition suitable for coating the interior walls of food containers and adapted to withstand a processing heat and comprising, in combination: a mixture of wood pitch and gas pitch having the volatile non-drying portions thereof removed; and a suitable solvent, substantially as specified.

3. A protective lacquer or coating composition suitable for coating the interior walls of food containers and adapted to withstand a processing heat and comprising a pitch having the volatile non-drying portions thereof removed and dissolved in benzol, substantially as specified.

4. A protective lacquer or coating composition suitable for coating the interior walls of food containers and adapted to withstand a processing heat and comprising a mixture of wood pitch and gas pitch having the volatile non-drying portions thereof removed and dissolved in benzol, substantially as specified.

5. A protective lacquer or coating composition suitable for coating the interior walls of food containers and adapted to withstand a processing heat and comprising a pitch having the volatile non-drying portions thereof removed and a suitable solvent in the proportion approximating six ounces of the pitch and one gallon of the solvent, substantially as specified.

6. A protective lacquer or coating composition suitable for coating the interior walls of food containers and adapted to withstand a processing heat and comprising, in combination: a mixture of pitches having the volatile non-drying portions thereof removed, one of which is wood pitch; and a suitable solvent, substantially as specified.

7. A protective lacquer or coating composition suitable for coating the interior walls of food containers and adapted to withstand a processing heat and comprising a mixture of wood pitch and gas pitch having the volatile non-drying portions thereof removed in the proportion approximating two parts by weight of the wood pitch to one part by weight of the gas pitch and dissolved in a suitable solvent, substantially as specified.

8. A protective lacquer or coating composition suitable for coating the interior walls of food containers and adapted to withstand a processing heat and comprising a mixture of pitches, one of which is wood pitch having the volatile non-drying portions thereof removed, dissolved in benzol in the proportion approximating six ounces of the cooked mixture to one gallon of the benzol, substantially as specified.

9. A protective lacquer or coating composition suitable for coating the interior walls of food containers and adapted to withstand a processing heat and comprising a mixture of wood pitch and gas pitch in the proportion approximating two parts by weight of the former to one part by weight of the latter having the volatile non-drying portions thereof removed, and dissolved in benzol, the cooked mixture of pitches and benzol being in the proportion approximating six ounces of the cooked mixture of pitches to one gallon of benzol, substantially as specified.

10. A protective lacquer or coating composition suitable for coating the interior walls of food containers and adapted to withstand a processing heat and comprising, in combination: a cooked pitch having the volatile non-drying portions thereof removed; benzol; and linseed oil, substantially as specified.

11. A protective lacquer or coating composition suitable for coating the interior walls of food containers and adapted to withstand a processing heat and comprising a mixture of pitches, one of which is wood pitch, having the volatile non-drying portions thereof removed, linseed oil and benzol, the parts being in the proportion approximating six ounces of the cooked pitch, one gallon of benzol, linseed oil three per cent. by weight of the cooked pitch.

JOHN G. HODGSON.

Witnesses:
PEARL ABRAMS,
ESTHER ABRAMS.